United States Patent [19]

Pompa

[11] Patent Number: 4,718,721
[45] Date of Patent: Jan. 12, 1988

[54] CHAIR COVER

[76] Inventor: Susan Pompa, 7215 N. Kildare, Lincolnwood, Ill. 60646

[21] Appl. No.: 726,347

[22] Filed: Apr. 22, 1985

[51] Int. Cl.⁴ .............................................. A47C 31/10
[52] U.S. Cl. ................................... 297/219; 297/224; 297/229
[58] Field of Search .............. 297/219, 224, 229, 223, 297/226, 227, 228

[56] References Cited

U.S. PATENT DOCUMENTS

| D. 267,523 | 1/1983 | Neilson | 297/219 |
|---|---|---|---|
| 2,172,890 | 9/1939 | Phillips | 297/226 |
| 2,191,956 | 2/1940 | Coldren | 297/224 |
| 3,253,861 | 5/1966 | Howard | 297/219 |
| 3,338,630 | 8/1967 | Dudley | 297/219 |
| 4,396,227 | 8/1983 | Neilson | 297/219 |

FOREIGN PATENT DOCUMENTS

| 796209 | 10/1968 | Canada | 297/229 |
|---|---|---|---|
| 1511646 | 12/1967 | France | 297/219 |
| 303282 | 1/1929 | United Kingdom | 297/229 |
| 929027 | 6/1963 | United Kingdom | 297/229 |
| 1158281 | 7/1969 | United Kingdom | 297/219 |

Primary Examiner—Francis K. Zugel
Attorney, Agent, or Firm—Paul H. Gallagher

[57] ABSTRACT

A chair cover having a main panel covering the seat portion and the backrest of a chair. The chair cover is wider at one end than at the other, and reversible, end-for-end, to apply the wide end to a wide seat portion, and the narrow end to the narrow backrest, and vice versa. It has a bulbous portion which aids fitting it to the horizontal and vertical parts of the chair. The panel is made up of a series of transverse sections, and is dimensioned to have a marginal turned over rear portion that folds back on the rear side of the side. A stretchable trimming strip is secured to the edge of the rear portion, and extends therearound. The cover can be fitted over and will hold an inflated or foam cushion in place on the chair, against displacement as the user leaves the chair. It can be made of natural sheepskin, or other materials.

2 Claims, 12 Drawing Figures

U.S. Patent  Jan. 12, 1988  Sheet 1 of 2  4,718,721
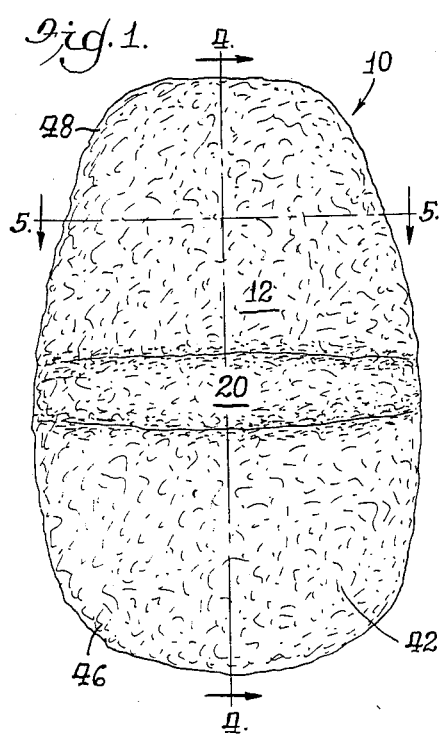
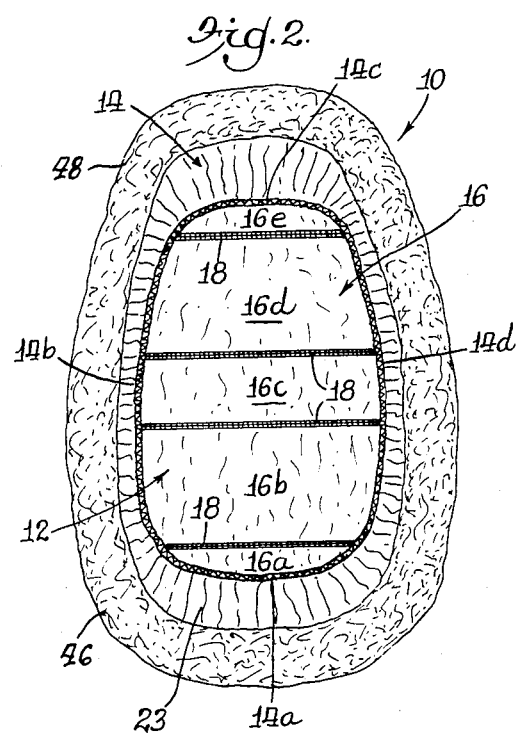
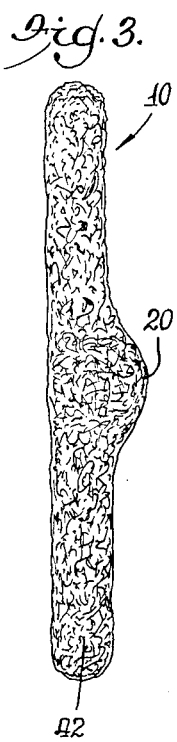
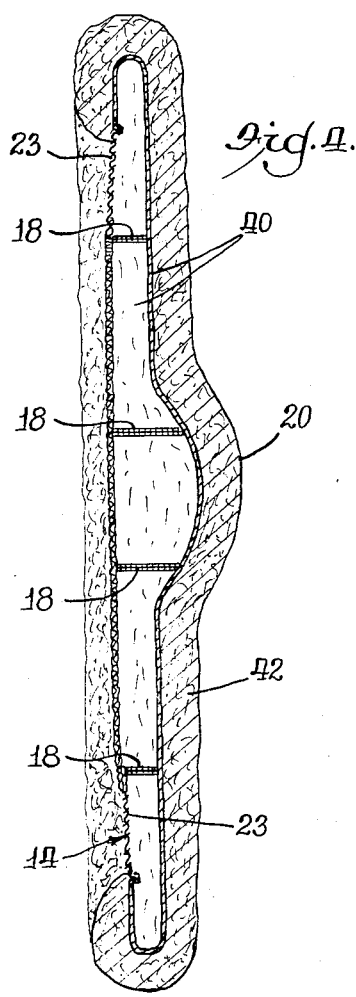
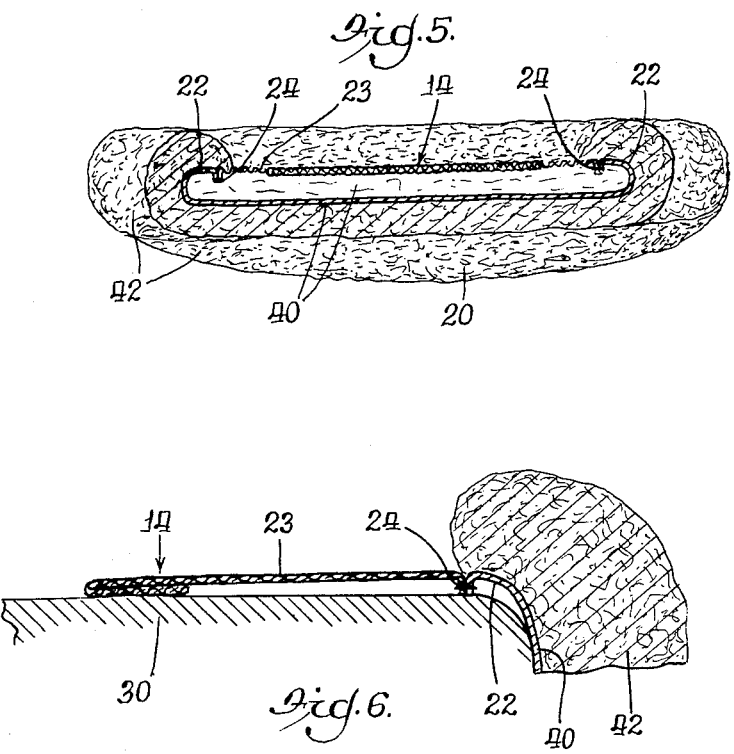

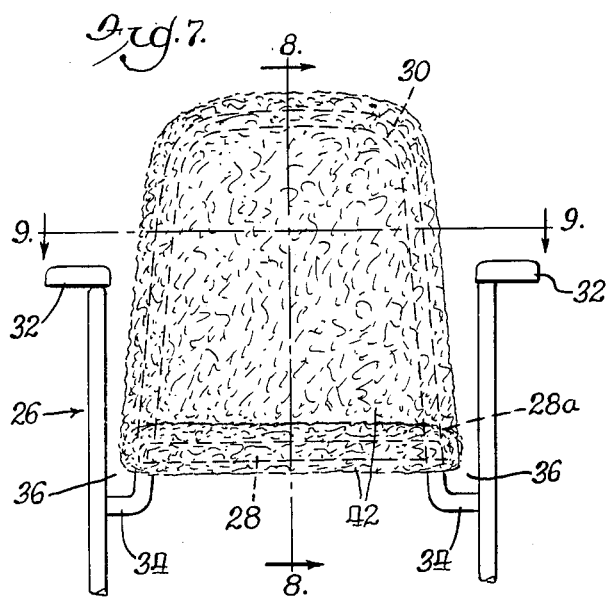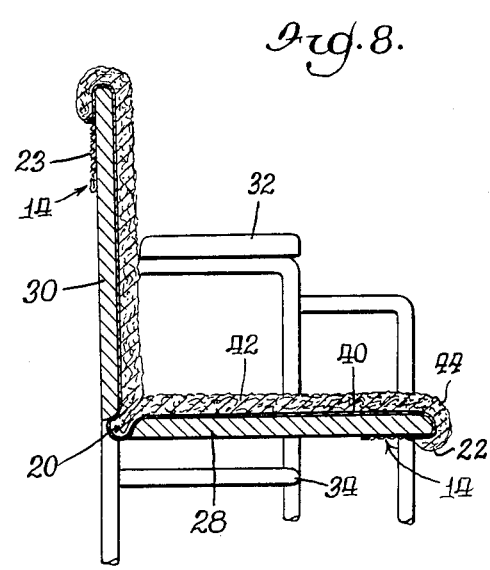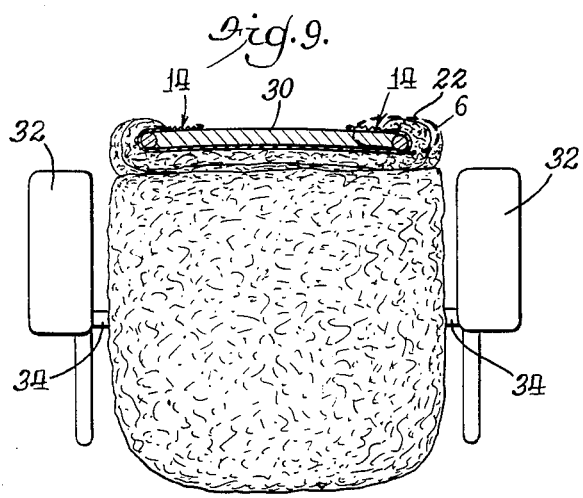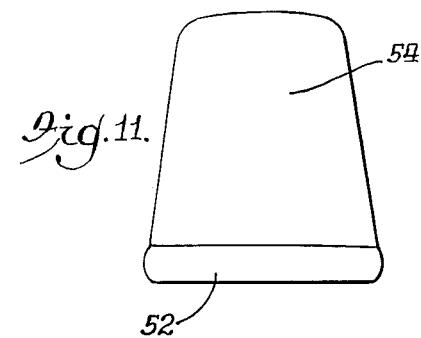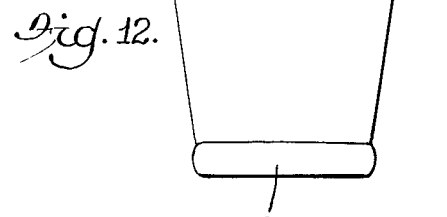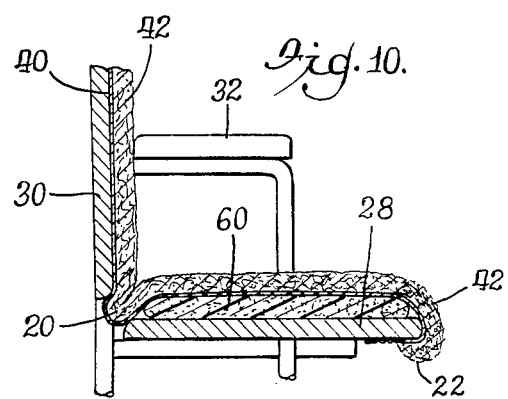

CHAIR COVER

FIELD OF THE INVENTION

The invention resides in the field of the use of chairs by people, or patients, who are at least partially incapacitated. In the case where the patient spends a great deal of time in a chair, sores develop, or at least discomfort follows. This condition is of course a matter of degree, and in the case where a person spends only a limited amount of time in a chair, there may be only discomfort involved, but where a patient spends a great amount of time, or all his time that is not in bed, in the chair, such as a wheel chair, sores develop directly related to his seating in the chair. The condition may occur as in a wheel chair, or for example a powered scooter type chair, indoors and outdoors, and even in public places. The sores develop very often in hips and back.

OBJECTS OF THE INVENTION

A broad object of the invention is to provide a cover for a chair, particularly a patient's chair, to prevent sores and discomfort to the patient who uses the chair, having the following features and advantages:

1. It can be easily applied to a chair of the kind having a seat and a back rest at an angle to each other, and securely retained thereon, and readily removed therefrom.

2. It provides protection to a maximum portion of the body of the user.

3. It is of such physical construction as to enable it to be fitted to a chair in gripping condition, to securely hold it thereon.

4. A novel trimming member, of stretchable and elastic material, specially coacts with the physical construction to facilitate its adaptation to chairs of different sizes and proportions.

5. It is so shaped that a single one will selectively fit a chair having a wide seat and a narrow backrest, or one having a narrow seat and a wide backrest.

6. The cover is effective for holding in place a cushion under it on the chair, such as an inflated cushion, or foam cushion, when the chair is occupied and as the patient leaves the chair.

7. It is made of natural sheepskin, with corresponding advantages in providing comfort to the user, and in having a long life with full effectiveness.

DESCRIPTION OF A PREFERRED EMBODIMENT

In the drawings,

FIG. 1 is a front view of the chair cover made according to the invention, in extended position;

FIG. 2 is a rear view of the chair cover;

FIG. 3 is an edge view taken from the left of FIG. 1;

FIG. 4 is a sectional view taken at line 4—4 of FIG. 1;

FIG. 5 is a sectional view taken at line 5—5 of FIG. 1;

FIG. 6 is a large scale view of that portion surrounded in dot-dash lines indicated at 6 in FIG. 9, semi-diagrammatically illustrating the positioning of the elements;

FIG. 7 is a front view of the chair cover applied to a chair and showing a portion of the chair;

FIG. 8 is a sectional view taken at line 8—8 of FIG. 7;

FIG. 9 is a sectional view taken at line 9—9 of FIG. 7;

FIG. 10 is a fragmentary sectional view, oriented according to FIG. 8, showing the chair cover also covering a separate cushion that is placed on the chair;

FIG. 11 is a simple outline view from the front of a chair having a wide seat and a narrow backrest; and FIG. 12 is a outline view similar to FIG. 11, but showing a chair with a narrow seat and wide backrest.

The chair cover possesses a special physical construction which enables it to grip the chair to which it is applied, in a very effective way. Another prominent feature is that it is preferably made of natural sheepskin with corresponding advantages. In the following description, attention is direction first to its physical construction, and the advantages resulting therefrom.

The construction of the panel includes the concept that a flat piece can not have its marginal portion turned under, with the turned under position in a flat condition operable for holding the main part of the panel in position on an object. This is based on the concept that the outer marginal portion, before being folded under, assumes a greater peripheral dimension than when it is turned under, thus having a greater quantity or mass, linearly around the panel, and can not lie flat. This concept is particularly present in the case of a round object, as compared with one having straight linear sides. The present invention involves a novel concept of overcoming this phenomenon, having a construction whereby the panel is made up of a plurality of sections or strips generally parallel and extending across the panel. The following description is directed first to the physical construction just referred to.

Referring in detail to the drawings, the chair cover is best shown in its entirety in FIGS. 1 and 2. FIG. 1 shows the front side of the chair cover, in extended flat position, while FIG. 2 shows the rear side.

The chair cover is indicated in its entirety at 10 and includes a main panel 12, of certain shape and characteristics referred to below, and a stretchable and flexible trimming strip 14 secured to the marginal edge of the main panel. The chair cover assumes a normal position or attitude which is somewhat straight (FIGS. 3 and 4), but shaped to fit a chair which includes a horizontal seat, and a backrest adjacent the vertical.

The main panel 12 is effectively unitary, but made up of a plurality of separate sections secured together (FIG. 2) indicated as a group at 16, and individually identified 16a, 16b, 16c, 16d, and 16e. The sections extend transversely, throughout the full width of the main panel (FIGS. 2 and 4), adjacent ones being secured together at seams 18. For purposes of fitting it to the chair, the central portion of the panel is made extra full, or bulbous, as indicated at 20, as referred to again hereinbelow, and this bulbous or bulgy portion is produced by utilizing sections 16 of different lengths, i.e., transversely of the panel. In this arrangement, the center section 16c is relatively narrow, and it is of substantially greater length than the others. To have the bulbous portion 20 diminish gradually, the adjacent sections 16b, 16d are of greater length, transversely of the main panel, at positions adjacent the center section but tapered to a narrow portion at the opposite ends of the main panel, adjacent the outermost sections 16a, 16e, and the latter sections are of least dimension transversely, in proportion to the different portions of the main panel, the panel itself being wider at one end (bottom, FIG. 2) than the other, as will be referred to again hereinbelow.

Reference is next made to the turned over rear portion referred to in the general description above. The main panel 12 includes a main front portion 21 and the turned over rear portion, the latter being indicated at 22, which is constituted by the peripheral edge portion of the main panel and extends around the periphery, and fits on the rear or bottom of the chair. The sections 16 of the panel are of such lengths, relative to one another, that in the relaxed position of the panel, the edge portion 22 normally retains its turned over position, and this retention is aided by the trimming strip 14 which is secured to the inner edge of the edge portion 22 throughout the inner marginal edge of the latter. The trimming strip 14 is provided with stretchable and elastic band 23 (FIG. 6) held in a seam 24 thereof. This stretchable and elastic band 23 has a shorter linear length than the edge of the edge portion 22, so that it pulls inwardly on the latter, and the trimming strip 14 lies essentially in the plane of the edge portion 22. This trimming strip and particularly the stretchable band 23, secure the seat cover on the chair, as referred to again hereinbelow. For purposes of convenience in identifying portions of the seat cover on the chair, and referring to FIG. 2, the trimming strip includes side elements 14a, 14b and end elements 14c, and 14d.

The sections 16 are so dimensioned, in direction transversely of each section, that when the edge portion 22 is in its turned over position, the end portions of the sections, that form that edge portion, themselves form a plane in which the edge portion lies, this plane lying essentially parallel with the plane of the main portion of the panel. In other words, the amount of material, in the sections taken together, that lie in the edge portion 22, when measured linearly around the edge portion, are such as to form the plane mentioned, as contrasted with the situation where an outer peripheral portion of the main panel 12 that originally lies in a plane common to the main portion, is so turned under, it could not lie in a plane.

Referring next to FIGS. 7-9, a chair is indicated at 26. A patient's chair can be of any of different kinds, including motorized scooters and chairs, etc. and in most if not all of these kinds of facilities, the chair has a horizontal seat and a backrest that is at or near the vertical. FIGS. 7-9 show the barest elements of a chair, in diagrammatic form, representing any of the various kinds of chairs in use by patients. In FIG. 7 the chair 26 includes a seat 28, a backrest 30, and arm rests 32. The arm rests are usually mounted on the seat by brackets 34 so designed and positioned as to leave the side edges 28a of the seat free from the arm rest, providing a space 36 into which the edges of the seat cover, in the present case, extend in being applied to the chair.

In FIGS. 7-9, one end of the chair cover is fitted to the seat and the adjacent parts of the edge portion 22 are fitted under the seat around the three exposed edges; the central portion 20 is fitted down into and against the juncture of the seat and the backrest, and the panel then continued upwardly on the backrest and fitted over the three exposed edges thereof, with the adjacent parts of the edge portion 22 fitted behind the backrest, in the same manner as referred to above. The edge portion 22 produces a great securing effect working against dislodgement from the chair, and this effect is of course aided by the trimming strip, which because of its elastic nature produces a constant pull on the portion 22.

The central portion 20 of the panel (FIGS. 3,4) as noted above, is of greater transverse dimensions than the remainder, and this portion fits down into the space at the juncture between the seat and backrest. This formation or contour of the panel aids in the panel closely fitting and following the contour of the chair, so that the remaining portions of the panel fit snugly against the seat and backrest without any tendency to be drawn therefrom as is usual where a cover is positioned at an angle such as in the chair.

The trimming strip 14 is made up of a woven fabric, preferably nylon and is somewhat stretchable, particularly in longitudinal direction i.e., in the direction of the edges of the rear portion. The elastic band 23 is of any suitable kind and stretches in the same direction, the elastic band providing the greater part of the drawing-in of the edge portion 22, with the trimming strip itself also aiding in that effect.

A great advantage of the construction is the turning under of the rear portion 22 under the seat, and particularly at the front edge of the seat, as indicated at 44 in FIG. 8. At this location the patient's lower legs depend, and they often rest against the front edge of the seat. With the edge portion 22 provided, the rear side of the legs, or rear side of the knees, rest against this portion and are cushioned and comforted by the deep texture of the chair cover, particularly in the case of wool.

The chair cover is specially constructed to fit different shaped chairs. As will be observed particularly in FIGS. 1 and 2, the lower end as indicated at 46 is wider than the upper end indicated at 48. A most common difference between chairs is that certain ones have a wide seat and a narrow backrest while others are arranged oppositely, having a narrow seat and a wide backrest. The chair cover of the present invention is thus applicable to either kind of such seat, the chair cover is positioned in the direction for the wide and narrow ends thereof to be fitted on the corresponding wide and narrow parts of the chair. The chair cover will fit on either kind with equal effectiveness, being held snugly and firmly against the chair by the turned over rear portion 22 of the sheepskin itself, plus the greater effect of the trimming strip 14. FIGS. 11 and 12 show, in outline form, these two kinds of chairs. In FIG. 11 the chair includes a wide seat 52 and a narrow backrest 54, while the chair of FIG. 12 includes a narrow seat 56 and a wide backrest 58, and the chair cover is applied in corresponding orientation.

The snug fitting and holding of the rear portion 22 has great effectiveness in holding the cover on the chair, and in proper-position thereon, against the tendency to displace it by the movements of the patient seating in the chair, such as shifting positions, and in arising therefrom. Great effectiveness is provided by the rear portion 22, and that in turn becomes effective by the construction provided by the sections 16, as referred to above. The sections, originally separate, are pre-dimensioned so that when secured together the rear portion 22 is positioned flat, or essentially in a plane. This physical structure of the device enables it to be made of any of a wide variety of materials including non-wool-like materials, such as vinyl and flat cloth, as well as imitation sheepskin, and natural sheepskin, notwithstanding the fact that it is preferably made of natural sheepskin as referred to in detail particularly hereinbelow. The expression "fabric" as used herein, and particularly in the claims, is generic to any of the kinds of materials mentioned, including wool and wool-like materials, and non-wool-like materials.

Still another great advantage of the chair cover is its effectiveness in holding a cushion in place on the chair. Referring to FIG. 10 a cushion 60 is positioned on the seat of the chair and the chair cover is put in place in the same manner as described above, and over the cushion. Because of the effectiveness of the turned over rear portion 22, and the trimming strip 14, the cushion 60 is firmly held in place while the patient is seated in the chair, and when he gets into the chair and leaves it. Such cushions may be for example gel pads, inflatable cushions, foam cushions, etc.

As noted above, the seat cover, i.e., the main panel 12 is preferably of natural sheepskin, that is, it is constituted by the hide of the animal itself, and includes the leather 40 and the wool 42. The leather is tanned, either by ordinary tanning process, but preferably gluteraldehyde tanned. While the seat cover is preferably made of natural sheepskin, the invention is of sufficient breadth to cover various synthetic materials, many of which are known, and which include an element representing the leather and a nap corresponding to the fibers of the wool, but they do not of course have the advantages of natural wool. The physical construction, described, which includes the transverse sections, can be incorporated in the seat cover whether it is made of natural sheepskin, or synthetic materials.

For convenience the hide of the sheep may be referred to herein as a fleece, to also cover synthetic materials including a base corresponding to the leather, and fibers corresponding to the wool. In synthetic materials, the base is often in the form of a fabric, and may be referred to by that term.

Natural sheepskin has many great advantages for comfort, and particularly for infirm persons. The sheepskin may be of any desired depth, i.e., thickness of the wool. The wool is very soft and provides great warmth in the winter and relatively cool effect in the summer. The great air spaces in the wool provide this cooling effect.

Another advantage of wool is that is will withstand rain and snow conditions. Water does not impair the condition of the hide, which merely dries out and assumes its original good condition.

Wool furthermore provides a great advantage in sheer comfort to the patient, or the user of the chair. Aside from medical disablement, the patient is often, if not always, bothered by aches and pains from the mere act of sitting. The wool in this case greatly overcomes that condition, and provides a great cushion, and one that is considered almost perfect.

A still further advantage is that wool does not absorb excessive heat from the sun, to such extent as to render it uncomfortable to the patient sitting therein.

Still another advantage of wool is its safety with respect to fire hazards. Wool does not break out in flame, but only smolders if ignited, and there are treatments for wool available, that will provide still greater safety conditions with respect to fire.

The chair cover provides still an added feature, - its appearance is very attractive. The turned over rear portion 22, being continuous around the peripheral edges of the chair, completely hides the edges of the chair and presents a continuous cushioning, or wool effect, throughout.

I claim:

1. A chair cover comprising, a main panel of sheepskin including the leather and wool, having a front side with the wool expose thereon, and a rear side, and having a length greater than its width, the panel being made up of a plurality of sections extending transversely and secured together, forming a unitary character of the panel, the sections being of such length that, in their position in the completed panel, and with the panel in relaxed position, their end portions form a rear portion of the panel extending peripherally around the panel on the rear side thereof, the rear portion extending transversely inwardly, essentially toward the center of the panel, and a continuous flexible trimming strip secured to the inner edge of the rear portion continuously therearound, the central portion of the panel, considered longitudinally of the panel, being of greater width, transversely of the panel, than the end portions whereby to provide a bulgy portion, the bulgy portion being adapted to be fitted into a space between the seat and backrest of the chair to which the cover is applied whereby to enable the end portions to fit snugly to the seat and backrest, the panel having one end portion wider than the other and both end portions being tapered at least to a degree, the sections of the panel including a central section that is longer, transversely of the panel, than the remaining sections, and constituting at least a substantial portion of said bulgy portion, and the remaining panels being tapered, diminishing in length, transversely of the panel, progressively toward the ends of the panel.

2. A chair cover according to claim 1 wherein, the sheepskin is gluteraldehyde tanned.

* * * * *